(12) United States Patent
Kubo et al.

(10) Patent No.: US 11,676,490 B2
(45) Date of Patent: Jun. 13, 2023

(54) CONTROL APPARATUS, SYSTEM, NON-TRANSITORY COMPUTER READABLE MEDIUM, TERMINAL APPARATUS, AND USER SUPPORT METHOD

(71) Applicant: TOYOTA JIDOSHA KABUSHIKI KAISHA, Toyota (JP)

(72) Inventors: Chikage Kubo, Chofu (JP); Yusuke Kobayashi, Ota-ku (JP); Minoru Kubota, Toyota (JP); Kentaro Takahashi, Toyota (JP); Hideo Hasegawa, Nagoya (JP); Takashi Horiguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 17/154,856

(22) Filed: Jan. 21, 2021

(65) Prior Publication Data

US 2021/0225173 A1 Jul. 22, 2021

(30) Foreign Application Priority Data

Jan. 22, 2020 (JP) .............................. JP2020-008581

(51) Int. Cl.
| | |
|---|---|
| G08G 1/00 | (2006.01) |
| H04W 4/02 | (2018.01) |
| G06Q 10/109 | (2023.01) |
| G06Q 50/30 | (2012.01) |
| G06Q 10/02 | (2012.01) |

(52) U.S. Cl.
CPC ............. *G08G 1/202* (2013.01); *G06Q 10/02* (2013.01); *G06Q 10/109* (2013.01); *G06Q 50/30* (2013.01); *H04W 4/02* (2013.01)

(58) Field of Classification Search
CPC ...... G08G 1/202; G06Q 10/02; G06Q 10/109; G06Q 50/30; H04W 4/02; H04W 4/021; G06F 16/29; G06F 16/9537
USPC ...................................................... 455/456.1
See application file for complete search history.

(56) References Cited

U.S. PATENT DOCUMENTS

| | | | |
|---|---|---|---|
| 2017/0091856 A1* | 3/2017 | Canberk | ............... G06Q 10/02 |
| 2017/0186113 A1* | 6/2017 | Shaw | ............... G06Q 30/0627 |
| 2020/0104964 A1* | 4/2020 | Yasui | ............... G01C 21/3407 |
| 2021/0004770 A1* | 1/2021 | Bansal | ............... G06Q 10/1095 |

FOREIGN PATENT DOCUMENTS

| | | |
|---|---|---|
| JP | 2002-279260 A | 9/2002 |
| JP | 2015108915 A | 6/2015 |
| JP | 2018538618 A | 12/2018 |
| WO | 2017091262 A1 | 6/2017 |

* cited by examiner

Primary Examiner — Hirdepal Singh
(74) Attorney, Agent, or Firm — Oliff PLC

(57) ABSTRACT

A control apparatus includes a controller configured to acquire time slot data indicating a reserved time slot at a place that provides a service, and positional data indicating a position of a user who has reserved the time slot indicated by the time slot data, and determine whether to take the user to the place using a vehicle according to a remaining time until the time slot indicated by the time slot data, and the position indicated by the positional data.

14 Claims, 8 Drawing Sheets

CONTROL APPARATUS, SYSTEM, NON-TRANSITORY COMPUTER READABLE MEDIUM, TERMINAL APPARATUS, AND USER SUPPORT METHOD

CROSS-REFERENCE TO RELATED APPLICATION

This application claims priority to Japan Patent Application No. 2020-008581, filed on Jan. 22, 2020, the entire contents of which are incorporated herein by reference.

TECHNICAL FIELD

The present disclosure relates to a control apparatus, a system, a program, a terminal apparatus, and a user support method.

BACKGROUND

Patent Literature (PTL) 1 describes technology for sending an email to a portable information terminal of a person who has made a reservation for use of a facility when their turn to use the facility approaches, periodically acquiring the current position of the portable information terminal of the person through measurement from a base station, and in a case in which the person will not be in time for their reservation time, changing or canceling the reservation.

CITATION LIST

Patent Literature

PTL 1: JP 2002-279260 A

SUMMARY

In the technology described in PTL 1, measures to help a person be in time for their reservation time are insufficient.

It would be helpful to facilitate helping a user be in time for a reserved time slot.

A control apparatus according to the present disclosure includes a controller configured to:

acquire time slot data indicating a reserved time slot at a place that provides a service, and positional data indicating a position of a user who has reserved the time slot indicated by the time slot data; and determine whether to take the user to the place using a vehicle according to a remaining time until the time slot indicated by the time slot data, and the position indicated by the positional data.

A program according to the present disclosure is configured to cause a computer to execute operations, the operations including:

receiving a notification from a control apparatus configured to determine whether to take a user who has reserved a time slot at a place that provides a service, to the place, using a vehicle according to a remaining time until the reserved time slot and a position of the user, the notification notifying that the user is to be taken to the place using the vehicle; and presenting content of the received notification to the user.

A user support method according to the present disclosure includes:

determining, by a control apparatus, whether to take a user who has reserved a time slot at a place that provides a service, to the place, using a vehicle according to a remaining time until the reserved time slot and a position of the user; and transmitting, from the control apparatus to a terminal apparatus of the user, a notification notifying that the user is to be taken to the place using the vehicle, upon determining to take the user to the place using the vehicle.

According to the present disclosure, it is easy to help a user be in time for a reserved time slot.

DETAILED DESCRIPTION

Figure 1:
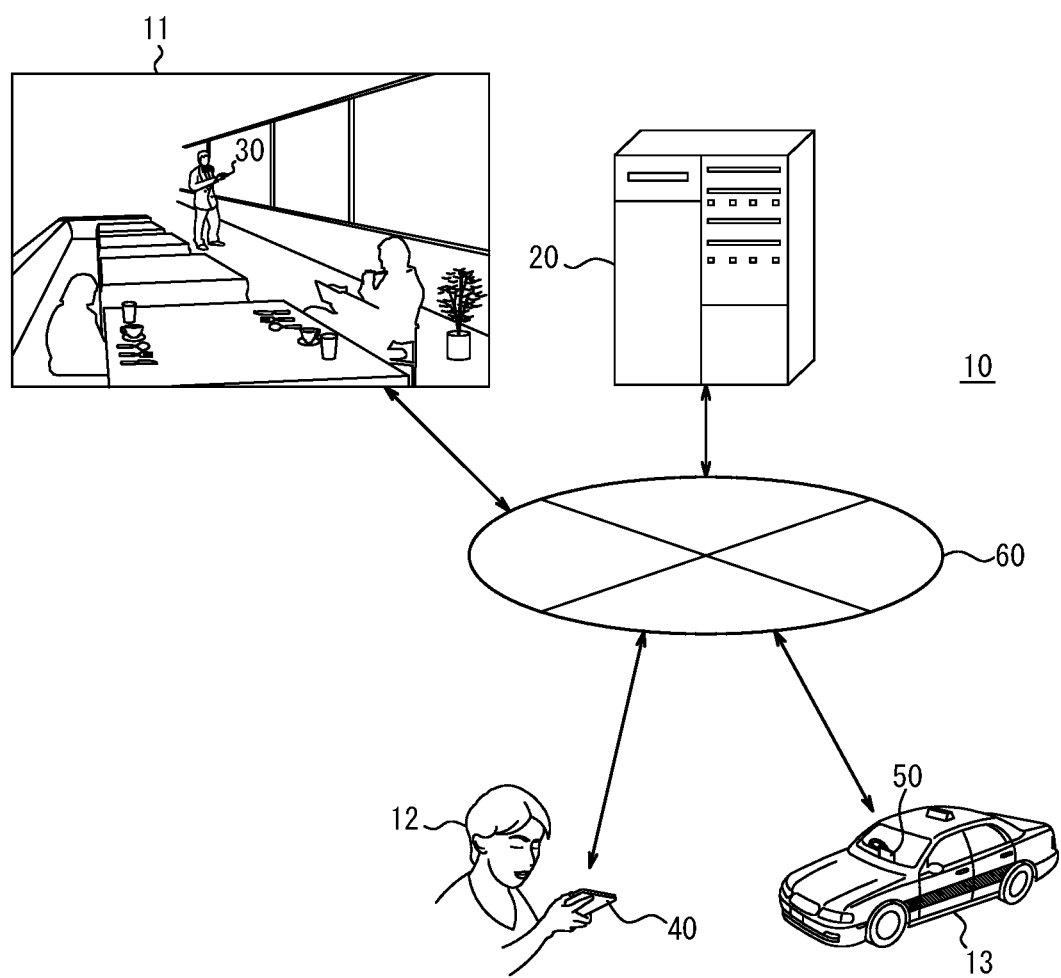
FIG. 1 is a diagram illustrating a configuration of a system according to an embodiment of the present disclosure.

Hereinafter, an embodiment of the present disclosure will be described with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes at least one control apparatus 20, at least one first terminal apparatus 30, at least one second terminal apparatus 40, and at least one third terminal apparatus 50.

The control apparatus 20 can communicate with the first terminal apparatus 30, the second terminal apparatus 40, and the third terminal apparatus 50 via a network 60.

The network 60 includes the Internet, at least one WAN, at least one MAN, or a combination thereof. The term "WAN" is an abbreviation of wide area network. The term "MAN" is an abbreviation of metropolitan area network. The network 60 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation of local area network.

The control apparatus 20 is installed in a facility such as a data center. The control apparatus 20 is, for example, a server that belongs to a cloud computing system or another type of computing system.

The first terminal apparatus 30 is held by a staff member of a place 11 that provides a service, such as a restaurant, a beauty salon, a hotel, a clinic, a hospital, a bank, a sports facility, a leisure facility, or an educational facility. Alternatively, the first terminal apparatus 30 is installed at the place 11. The first terminal apparatus 30 is, for example, a mobile device such as a mobile phone, a smartphone, or a tablet, or a PC. The term "PC" is an abbreviation of personal computer.

The second terminal apparatus 40 is held by a user 12 who has reserved a time slot at the place 11, such as a restaurant table, a hotel room, medical care at a clinic or a hospital, or a lesson at an educational facility. The second terminal apparatus 40 is, for example, a mobile device such as a mobile phone, a smartphone, or a tablet, or a PC.

The third terminal apparatus 50 is mounted or installed in a vehicle 13 such as a taxi or an on-demand bus. Alternatively, the third terminal apparatus 50 is held by a driver of the vehicle 13. The third terminal apparatus 50 is, for example, a vehicle-mounted device such as a car navigation device, a mobile device such as a mobile phone, a smartphone, or a tablet, or a PC.

The vehicle 13 is, for example, any type of automobile such as a gasoline vehicle, a diesel vehicle, an HV, a PHV, an EV, or an FCV. The term "HV" is an abbreviation of hybrid vehicle. The term "PHV" is an abbreviation of plug-in hybrid vehicle. The term "EV" is an abbreviation of electric vehicle. The term "FCV" is an abbreviation of fuel cell vehicle. The vehicle 13 is driven by a driver in the present embodiment, but the driving may be automated at any level. The automation level is, for example, any one of Level 1 to Level 5 according to the level classification defined by SAE. The name "SAE" is an abbreviation of Society of Automotive Engineers. The vehicle 13 may be a MaaS-dedicated vehicle. The term "MaaS" is an abbreviation of Mobility as a Service.

An outline of the present embodiment will be described with reference to FIG. 1.

In the system 10 according to the present embodiment, it is determined by the control apparatus 20 whether to take a user 12 who has reserved a time slot at a place 11 that provides a service, to the place 11, using the vehicle 13 according to the remaining time Tr until the reserved time slot and a position of the user 12. When it is determined to take the user 12 to the place 11 using the vehicle 13, a notification D7 notifying that the user 12 is to be taken to the place 11 using the vehicle 13 is transmitted from the control apparatus 20 to the second terminal apparatus 40 of the user 12. The content of the notification D7 is presented to the user 12 by the second terminal apparatus 40.

According to the present embodiment, it is easy to help the user 12 be in time for the reserved time slot. As a result, reservation changes and reservation cancellations may be less likely to occur.

Figure 2:
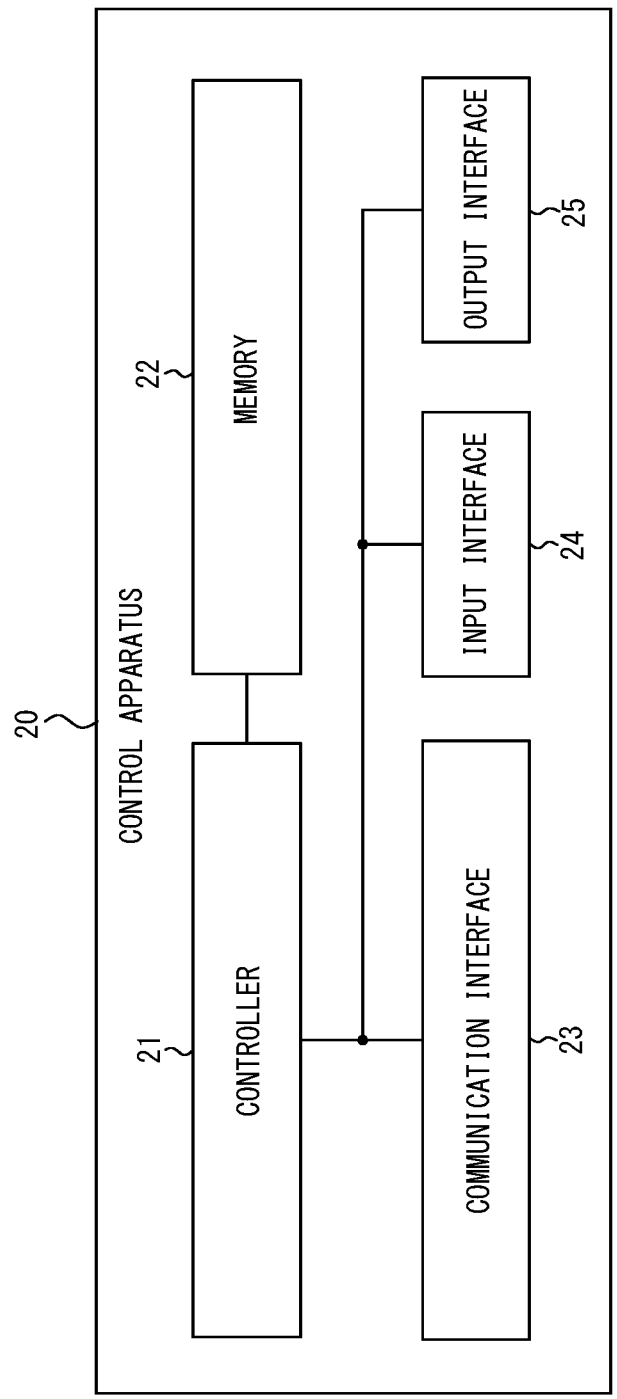
FIG. 2 is a block diagram illustrating a configuration of a control apparatus according to the embodiment of the present disclosure.

A configuration of the control apparatus 20 according to the present embodiment will be described with reference to FIG. 2.

The control apparatus 20 includes a controller 21, a memory 22, a communication interface 23, an input interface 24, and an output interface 25.

The controller 21 includes at least one processor, at least one dedicated circuit, or a combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The dedicated circuit is, for example, an FPGA or an ASIC. The term "FPGA" is an abbreviation of field-programmable gate array. The term "ASIC" is an abbreviation of application specific integrated circuit. The controller 21 executes processes related to operations of the control apparatus 20 while controlling each component of the control apparatus 20.

The memory 22 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20.

The communication interface 23 includes at least one interface for communication. The interface for communication is, for example, a LAN interface. The communication interface 23 receives data to be used for the operations of the control apparatus 20, and transmits data obtained by the operations of the control apparatus 20.

The input interface 24 includes at least one interface for input. The interface for input is, for example, a physical key, a capacitive key, a pointing device, a touch screen integrally provided with a display, or a microphone. The input interface 24 accepts an operation for inputting data to be used for the operations of the control apparatus 20. The input interface 24, instead of being included in the control apparatus 20, may be connected to the control apparatus 20 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data obtained by the operations of the control apparatus 20. The output interface 25, instead of being included in the control apparatus 20, may be connected to the control apparatus 20 as an external output device. As the connection method, any technology such as USB, HDMI®, or Bluetooth® can be used.

The functions of the control apparatus 20 are realized by execution of a control program according to the present embodiment by a processor corresponding to the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be recorded on a non-transitory computer readable recording medium. The non-transitory computer readable recording medium is, for example, a magnetic recording device, an optical disc, a magneto-optical recording medium, or a ROM. The program is distributed, for example, by selling, transferring, or lending a portable recording medium such as a DVD or a CD-ROM on which the program is recorded. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

The computer temporarily stores in a main memory, for example, a program recorded on a portable recording medium, or a program transferred from the server. Then, the computer reads the program stored in the main memory using a processor, and executes processes in accordance with the read program using the processor. The computer may read a program directly from the portable recording medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a dedicated circuit corresponding to the controller 21. That is, some or all of the functions of the control apparatus 20 may be realized by hardware.

Figure 3:
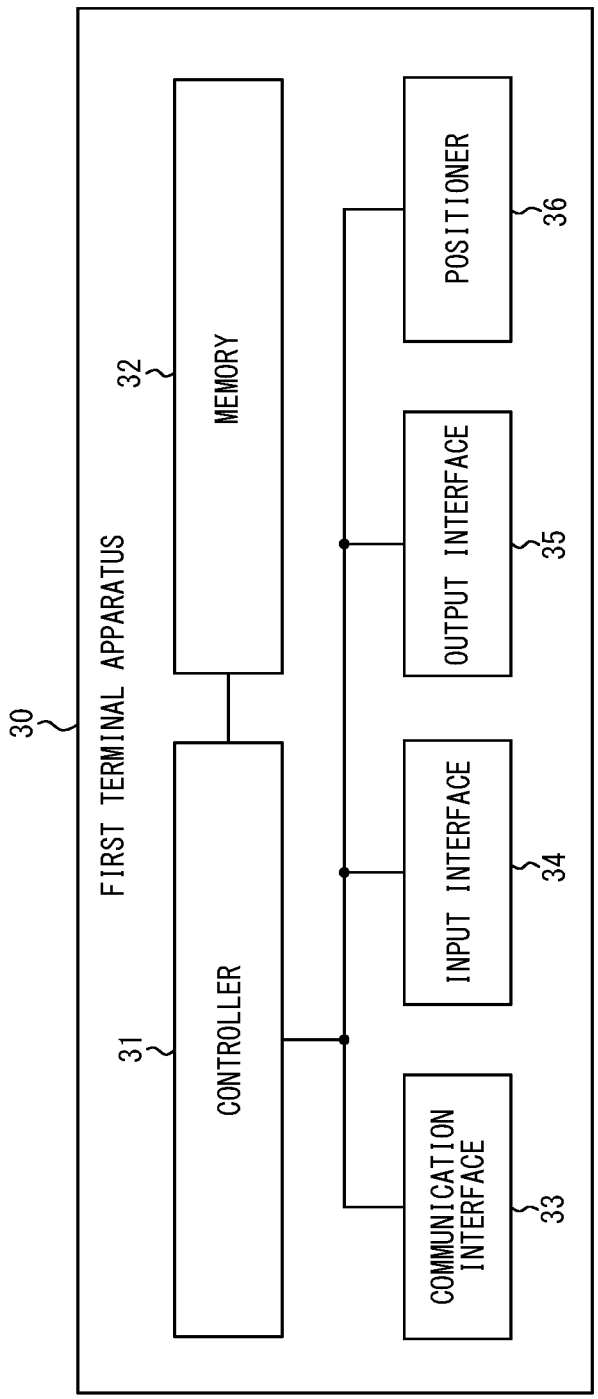
FIG. 3 is a block diagram illustrating a configuration of a first terminal apparatus according to the embodiment of the present disclosure.

A configuration of the first terminal apparatus 30 according to the present embodiment will be described with reference to FIG. 3.

The first terminal apparatus 30 includes a controller 31, a memory 32, a communication interface 33, an input interface 34, an output interface 35, and a positioner 36.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 executes processes related to operations of the first terminal apparatus 30 while controlling each component of the first terminal apparatus 30.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores data to be used for the operations of the first terminal apparatus 30 and data obtained by the operations of the first terminal apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives data to be used for the operations of the first terminal apparatus 30, and transmits data obtained by the operations of the first terminal apparatus 30.

The input interface 34 includes at least one interface for input. The interface for input is, for example, a physical key, a capacitive key, a pointing device, a touch screen integrally provided with a display, or a microphone. The input interface 34 accepts an operation for inputting data to be used for the operations of the first terminal apparatus 30. The input interface 34, instead of being included in the first terminal apparatus 30, may be connected to the first terminal apparatus 30 as an external input device. As the connection method, any technology such as USB, HDMI®, or Bluetooth® can be used.

The output interface 35 includes at least one interface for output. The interface for output is, for example, a display or a speaker. The display is, for example, an LCD or an organic EL display. The output interface 35 outputs data obtained by the operations of the first terminal apparatus 30. The output interface 35, instead of being included in the first terminal apparatus 30, may be connected to the first terminal apparatus 30 as an external output device. As the connection method, any technology such as USB, HDMI®, or Bluetooth® can be used.

The positioner 36 includes at least one GNSS receiver. The term "GNSS" is an abbreviation of global navigation satellite system. GNSS is, for example, GPS, QZSS, GLONASS, or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 36 measures the position of the first terminal apparatus 30.

The functions of the first terminal apparatus 30 are realized by execution of a first terminal program according to the present embodiment by a processor corresponding to the controller 31. That is, the functions of the first terminal apparatus 30 are realized by software. The first terminal program causes a computer to execute the operations of the first terminal apparatus 30, thereby causing the computer to function as the first terminal apparatus 30. That is, the computer executes the operations of the first terminal apparatus 30 in accordance with the first terminal program to thereby function as the first terminal apparatus 30.

Some or all of the functions of the first terminal apparatus 30 may be realized by a dedicated circuit corresponding to the controller 31. That is, some or all of the functions of the first terminal apparatus 30 may be realized by hardware.

Figure 4:
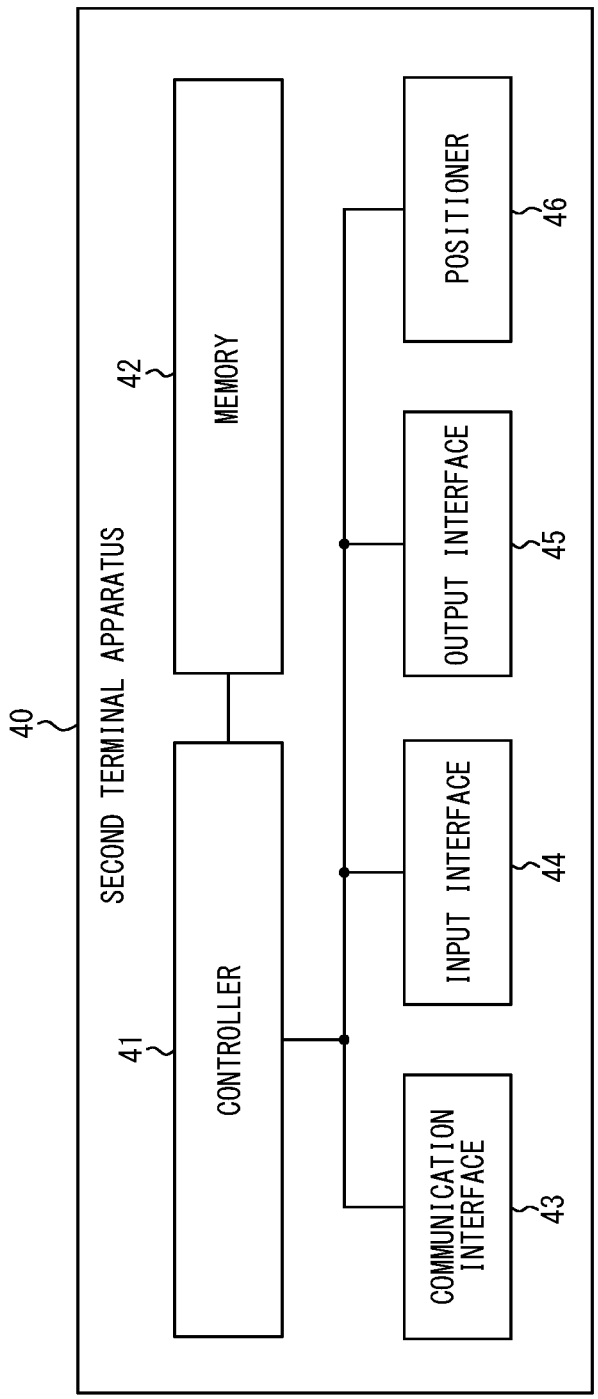
FIG. 4 is a block diagram illustrating a configuration of a second terminal apparatus according to the embodiment of the present disclosure.

A configuration of the second terminal apparatus 40 according to the present embodiment will be described with reference to FIG. 4.

The second terminal apparatus 40 includes a controller 41, a memory 42, a communication interface 43, an input interface 44, an output interface 45, and a positioner 46.

The controller 41 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 41 executes processes related to operations of the second terminal apparatus 40 while controlling each component of the second terminal apparatus 40.

The memory 42 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores data to be used for the operations of the second terminal apparatus 40 and data obtained by the operations of the second terminal apparatus 40.

The communication interface 43 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The communication interface 43 receives data to be used for the operations of the second terminal apparatus 40, and transmits data obtained by the operations of the second terminal apparatus 40.

The input interface 44 includes at least one interface for input. The interface for input is, for example, a physical key, a capacitive key, a pointing device, a touch screen integrally provided with a display, or a microphone. The input interface 44 accepts an operation for inputting data to be used for the operations of the second terminal apparatus 40. The input interface 44, instead of being included in the second terminal apparatus 40, may be connected to the second terminal apparatus 40 as an external input device. As the connection method, any technology such as USB, HDMI®, or Bluetooth® can be used.

The output interface 45 includes at least one interface for output. The interface for output is, for example, a display or a speaker. The display is, for example, an LCD or an organic EL display. The output interface 45 outputs data obtained by the operations of the second terminal apparatus 40. The output interface 45, instead of being included in the second terminal apparatus 40, may be connected to the second terminal apparatus 40 as an external output device. As the connection method, any technology such as USB, HDMI®, or Bluetooth® can be used.

The positioner 46 includes at least one GNSS receiver. GNSS is, for example, GPS, QZSS, GLONASS, or Galileo. The positioner 46 measures the position of the second terminal apparatus 40.

The functions of the second terminal apparatus 40 are realized by execution of a second terminal program according to the present embodiment by a processor corresponding to the controller 41. That is, the functions of the second terminal apparatus 40 are realized by software. The second terminal program causes a computer to execute the operations of the second terminal apparatus 40, thereby causing the computer to function as the second terminal apparatus 40. That is, the computer executes the operations of the second terminal apparatus 40 in accordance with the second terminal program to thereby function as the second terminal apparatus 40.

Some or all of the functions of the second terminal apparatus 40 may be realized by a dedicated circuit corresponding to the controller 41. That is, some or all of the functions of the second terminal apparatus 40 may be realized by hardware.

Figure 5:
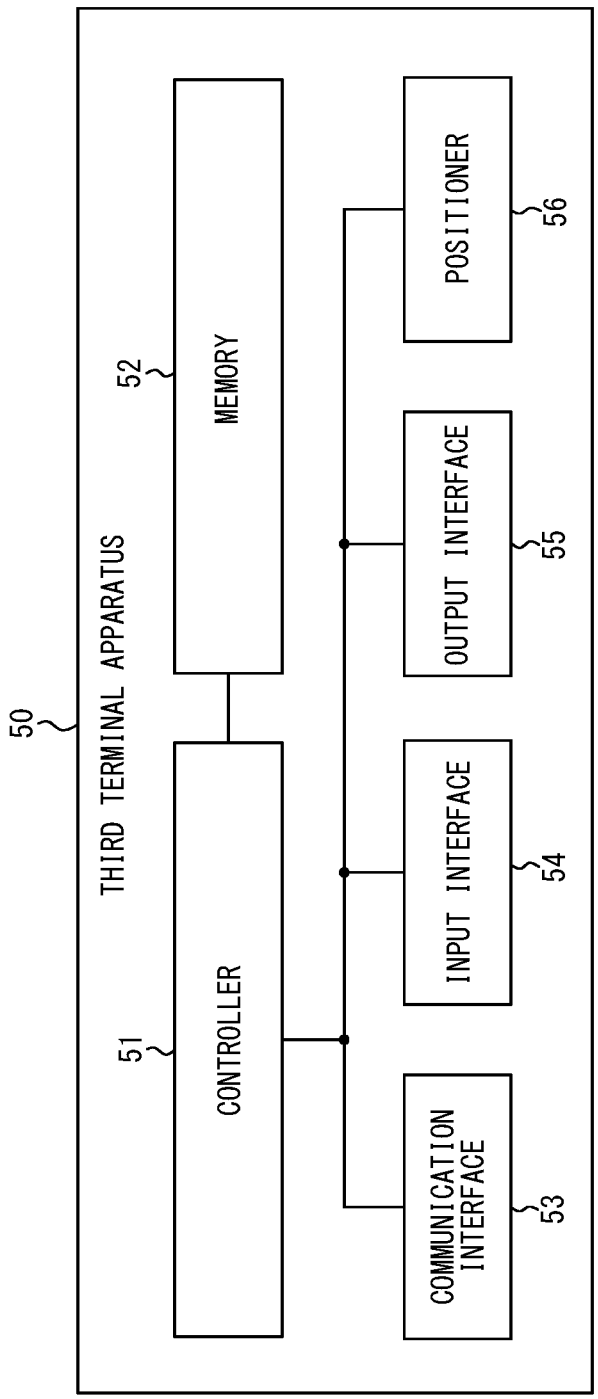
FIG. 5 is a block diagram illustrating a configuration of a third terminal apparatus according to the embodiment of the present disclosure.

A configuration of the third terminal apparatus 50 according to the present embodiment will be described with reference to FIG. 5.

The third terminal apparatus 50 includes a controller 51, a memory 52, a communication interface 53, an input interface 54, an output interface 55, and a positioner 56.

The controller 51 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 51 may include at least one ECU. The term "ECU" is an abbreviation of electronic control unit. The controller 51 executes processes related to operations of the third terminal apparatus 50 while controlling each component of the third terminal apparatus 50.

The memory 52 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 52 functions as, for example, a main memory, an auxiliary memory, or a cache memory. The memory 52 stores data to be used for the operations of the third terminal apparatus 50 and data obtained by the operations of the third terminal apparatus 50.

The communication interface 53 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The communication interface 53 receives data to be used for the operations of the third terminal apparatus 50, and transmits data obtained by the operations of the third terminal apparatus 50.

The input interface 54 includes at least one interface for input. The interface for input is, for example, a physical key, a capacitive key, a pointing device, a touch screen integrally provided with a display, or a microphone. The input interface 54 accepts an operation for inputting data to be used for the operations of the third terminal apparatus 50. The input interface 54, instead of being included in the third terminal apparatus 50, may be connected to the third terminal apparatus 50 as an external input device. As the connection method, any technology such as USB, HDMI®, or Bluetooth® can be used.

The output interface 55 includes at least one interface for output. The interface for output is, for example, a display or a speaker. The display is, for example, an LCD or an organic EL display. The output interface 55 outputs data obtained by the operations of the third terminal apparatus 50. The output interface 55, instead of being included in the third terminal apparatus 50, may be connected to the third terminal apparatus 50 as an external output device such as a display audio. As the connection method, any technology such as USB, HDMI®, or Bluetooth® can be used.

The positioner 56 includes at least one GNSS receiver. GNSS is, for example, GPS, QZSS, GLONASS, or Galileo. The positioner 56 measures the position of the third terminal apparatus 50.

The functions of the third terminal apparatus 50 are realized by execution of a third terminal program according to the present embodiment by a processor corresponding to the controller 51. That is, the functions of the third terminal apparatus 50 are realized by software. The third terminal program causes a computer to execute the operations of the third terminal apparatus 50, thereby causing the computer to function as the third terminal apparatus 50. That is, the computer executes the operations of the third terminal apparatus 50 in accordance with the third terminal program to thereby function as the third terminal apparatus 50.

Some or all of the functions of the third terminal apparatus 50 may be realized by a dedicated circuit corresponding to the controller 51. That is, some or all of the functions of the third terminal apparatus 50 may be realized by hardware.

Figure 6:
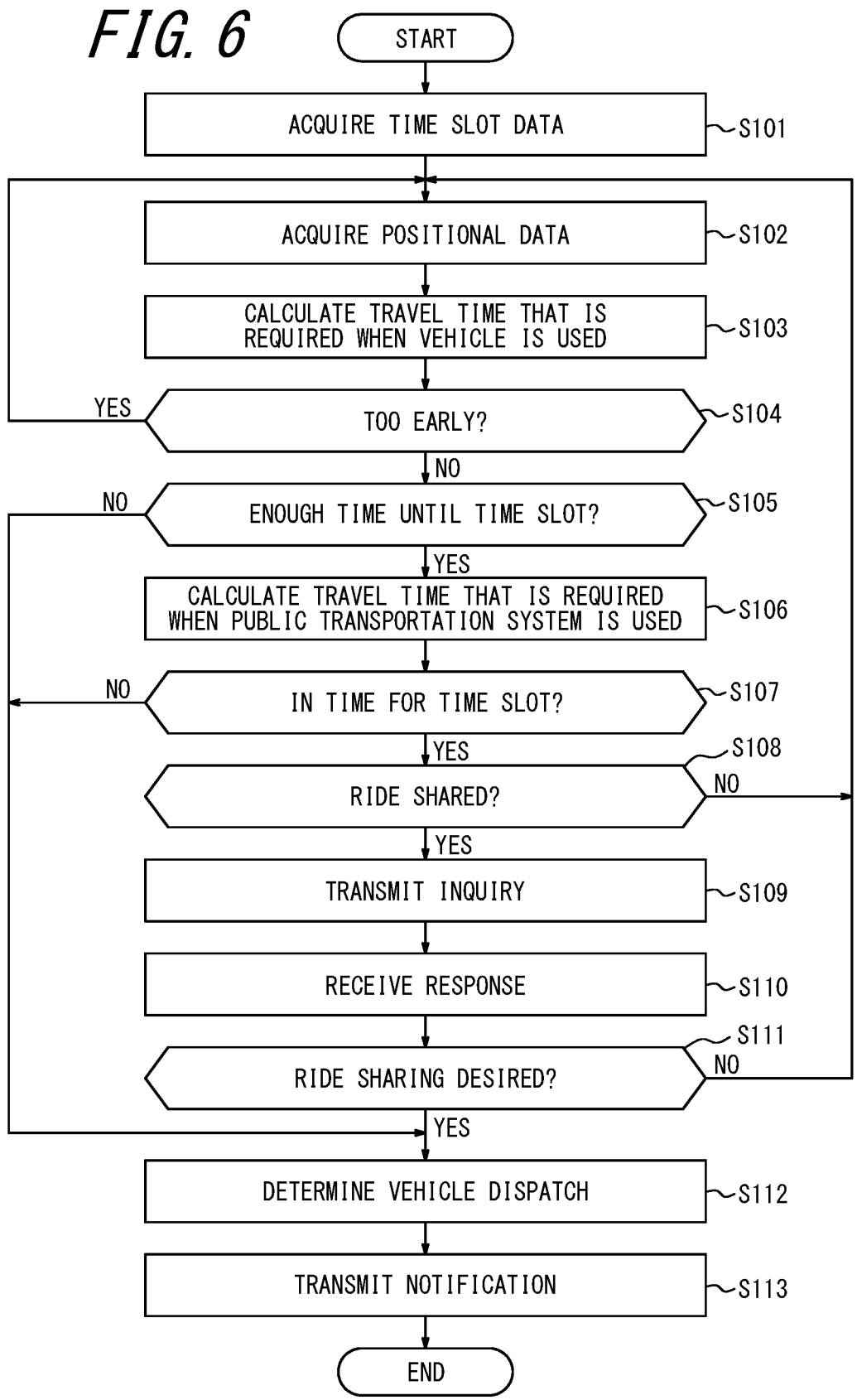
FIG. 6 is a diagram illustrating operations of the system according to the embodiment of the present disclosure.
Figure 7:
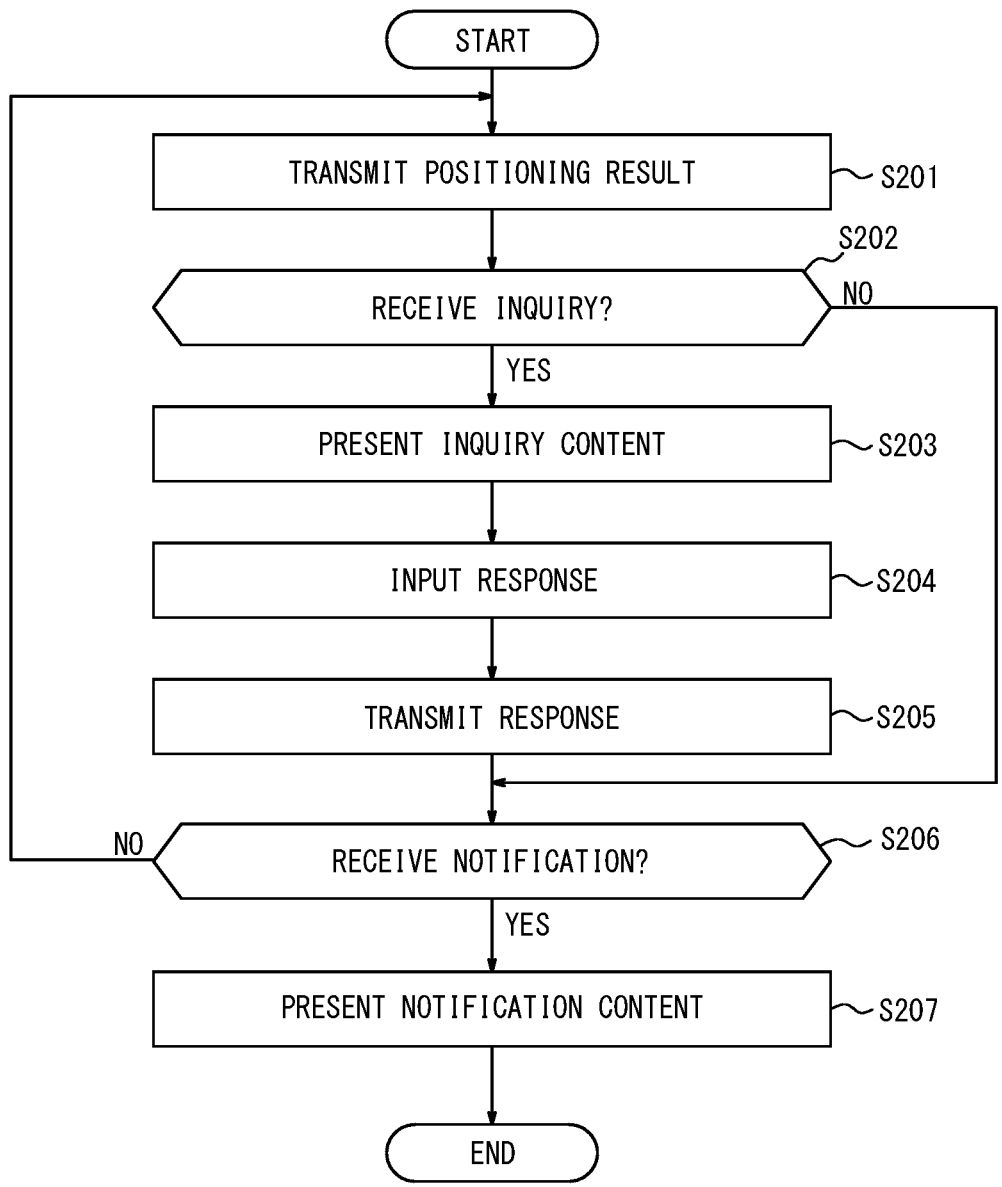
FIG. 7 is a diagram illustrating operations of the system according to the embodiment of the present disclosure.

Operations of the system 10 according to the present embodiment will be described with reference to FIGS. 6 and 7. These operations correspond to a user support method according to the present embodiment. FIG. 6 illustrates operations of the control apparatus 20. FIG. 7 illustrates operations of the second terminal apparatus 40.

In step S101 of FIG. 6, the controller 21 of the control apparatus 20 acquires time slot data D1. The time slot data D1 is data indicating a reserved time slot at a place 11 that provides a service.

The time slot data D1 may be acquired in any procedure, but, in the present embodiment, is acquired in the following procedure.

As an illustrative example, suppose that the place 11 is restaurant X. Suppose that a staff member of restaurant X has accepted a reservation for two adults at 19:00 on the day by telephone or by the first terminal apparatus 30. In a case in which the reservation is accepted by the first terminal apparatus 30, the reservation is notified by email or via an external system such as an Internet-based reservation system. The "illustrative example" is not intended to limit the present disclosure, but rather to aid in understanding of the present embodiment.

The controller 31 of the first terminal apparatus 30 accepts an operation to input the time slot data D1 by the staff member of restaurant X with the input interface 34 such as a touch screen or a microphone. The time slot data D1 indicates a table for two adults at 19:00 on the day, as a reserved time slot at restaurant X. The controller 31 of the first terminal apparatus 30 controls the communication interface 33 to transmit the input time slot data D1. The communication interface 33 transmits the time slot data D1 to the control apparatus 20.

The communication interface 23 of the control apparatus 20 receives the time slot data D1 from the first terminal apparatus 30. The controller 21 of the control apparatus 20 acquires the time slot data D1 received by the communication interface 23.

In step S102 of FIG. 6, the controller 21 of the control apparatus 20 acquires positional data D2. The positional data D2 is data indicating the position of a user 12 who has reserved the time slot indicated by the time slot data D1.

The positional data D2 may be acquired in any procedure, but, in the present embodiment, is acquired in the following procedure.

In step S201 of FIG. 7, the positioner 46 of the second terminal apparatus 40 measures the position of the second terminal apparatus 40. The controller 41 of the second terminal apparatus 40 controls the communication interface 43 to transmit, as a positioning result for the second terminal apparatus 40, the position measured by the positioner 46. The communication interface 43 transmits the positioning result for the second terminal apparatus 40 to the control apparatus 20.

The process in step S201 may be executed periodically, or may be executed non-periodically, such as upon a request from the control apparatus 20.

The communication interface 23 of the control apparatus 20 receives, from the second terminal apparatus 40, the positioning result transmitted in step S201. The controller 21 of the control apparatus 20 acquires, as the positional data D2, the positioning result received by the communication interface 23. That is, the controller 21 identifies the position of the user 12 from the positioning result for the second terminal apparatus 40.

In step S103 of FIG. 6, the controller 21 of the control apparatus 20 calculates the travel time Tv that is required to travel from the position indicated by the positional data D2 to the place 11, when the user 12 uses the vehicle 13.

The required travel time Tv may be calculated in any procedure, but, in the present embodiment, is calculated in the following procedure.

As an illustrative example, suppose that the vehicle 13 is taxi Y, in which rides can be shared.

The controller 21 of the control apparatus 20 refers to map data D3 to identify the position of restaurant X. The map data D3 is data indicating the positions of various locations including restaurant X. The map data D3 may be stored in advance in the memory 22 of the control apparatus 20, or may be accumulated in an external system such as an Internet-based GIS. The term "GIS" is an abbreviation of geographic information system. The controller 21 refers to the map data D3 to retrieve a route from the position indicated by the positional data D2 acquired in step S102 to the identified position of restaurant X that is taken when the user 12 uses taxi Y. The controller 21 may retrieve the route independently, or may retrieve the route using an external system such as an Internet-based GIS. The controller 21 calculates the travel time Tv that is required when the user 12 travels on the retrieved route by taxi Y. The controller 21 may calculate the required travel time Tv independently, or may calculate the required travel time Tv using an external system such as an Internet-based GIS.

In step S104 of FIG. 6, the controller 21 of the control apparatus 20 determines whether it is too early to take the user 12 to the place 11 using the vehicle 13.

Specifically, the controller 21 of the control apparatus 20 compares, with a first threshold V1, the difference obtained by subtracting the required travel time Tv calculated in step S103 from the remaining time Tr until the time slot indicated by the time slot data D1 acquired in step S102. The controller 21 determines whether it is too early to take the user 12 to the place 11 using the vehicle 13 depending on whether the difference obtained by subtracting the required travel time Tv from the remaining time Tr is greater than the first threshold V1. In a case in which the difference obtained by subtracting the required travel time Tv from the remaining time Tr is greater than the first threshold V1, that is, if it is too early to take the user 12 to the place 11 using the vehicle 13, the processes in step S102 and steps after step S102 are executed again. In a case in which the difference obtained by subtracting the required travel time Tv from the remaining time Tr is equal to or less than the first threshold V1, that is, if it is not too early to take the user 12 to the place 11 using the vehicle 13, processes in and after step S105 are executed.

The first threshold V1 may be any value, but if the first threshold V1 is too large, the user 12 has to wait at the place 11 for a long time, and if the first threshold V1 is too small, a buffer to accommodate delays in traveling to the place 11 cannot be secured. Therefore, in the present embodiment, the first threshold V1 is adjusted to a value such that the user 12 does not have to wait at the place 11 for a long period of time and the buffer can be secured.

In step S105 of FIG. 6, the controller 21 of the control apparatus 20 determines whether there is enough time until the time slot indicated by the time slot data D1.

Specifically, the controller 21 of the control apparatus 20 compares, with a second threshold V2 which is lower than the first threshold V1, the difference obtained by subtracting the required travel time Tv calculated in step S103 from the remaining time Tr until the time slot indicated by the time slot data D1 acquired in step S102. The controller 21 determines whether there is enough time until the reserved time slot depending on whether the difference obtained by subtracting the required travel time Tv from the remaining time Tr is greater than the second threshold V2. In a case in which the difference obtained by subtracting the required travel time Tv from the remaining time Tr is greater than the second threshold V2, that is, if there is enough time until the reserved time slot, processes in and after step S106 are executed. In a case in which the difference obtained by subtracting the required travel time Tv from the remaining time Tr is equal to or less than the second threshold V2, that is, if there is not enough time until the reserved time slot, processes in and after step S112 are executed.

The second threshold V2 is a value equal to or greater than 0 in the present embodiment, but may be any value less than the first threshold V1. For example, if late arrival is allowed, the second threshold V2 may be a value less than 0.

In step S106 of FIG. 6, the controller 21 of the control apparatus 20 calculates the travel time Tp that is required to travel from the position indicated by the positional data D2 to the place 11, when the user 12 uses a public transportation system such as a train or a fixed route bus.

The required travel time Tp may be calculated in any procedure, but, in the present embodiment, is calculated in the following procedure.

As an illustrative example, suppose that the public transportation system is train Z.

The controller 21 of the control apparatus 20 refers to the map data D3 to retrieve a route from the position indicated by the positional data D2 acquired in step S102 to the position of restaurant X identified in step S103 that is taken when the user 12 uses train Z. The controller 21 may retrieve the route independently, or may retrieve the route using an external system such as an Internet-based GIS. The controller 21 calculates the travel time Tp that is required when the user 12 travels on the retrieved route by train Z and on foot. The controller 21 may calculate the required travel time Tp independently, or may calculate the required travel time Tp using an external system such as an Internet-based GIS.

In step S107 of FIG. 6, the controller 21 of the control apparatus 20 determines whether the user 12 can be in time for the time slot indicated by the time slot data D1 in a case in which the user 12 uses the public transportation system.

Specifically, the controller 21 of the control apparatus 20 compares, with a third threshold V3 which is lower than the first threshold V1, the difference obtained by subtracting the required travel time Tp calculated in step S106 from the remaining time Tr until the time slot indicated by the time slot data D1 acquired in step S102. The controller 21 determines whether the user 12 can be in time for the reserved time slot even if the user 12 goes to the place 11 using the public transportation system depending on whether the difference obtained by subtracting the required travel time Tp from the remaining time Tr is equal to or greater than the third threshold V3. In a case in which the difference obtained by subtracting the required travel time Tp from the remaining time Tr is equal to or greater than the third threshold V3, that is, if the user 12 can be in time for the reserved time slot even if the user 12 goes to the place 11 using the public transportation system, processes in and after step S108 are executed. In a case in which the difference obtained by subtracting the required travel time Tp from the remaining time Tr is less than the third threshold V3, that is, if the user 12 cannot be in time for the reserved time slot if the user 12 goes to the place 11 using the public transportation system, processes in and after step S112 are executed.

The third threshold V3 is a value equal to or greater than 0 in the present embodiment, but may be any value less than the first threshold V1. For example, if late arrival is allowed, the third threshold V3 may be a value less than 0.

In step S108 of FIG. 6, the controller 21 of the control apparatus 20 determines whether another user uses the vehicle 13, namely, whether a ride in the vehicle 13 is to be shared. In a case in which no other user uses the vehicle 13, that is, if a ride in the vehicle 13 is not to be shared, the processes in and after step S102 are executed again. In a case in which another user uses the vehicle 13, that is, if a ride in the vehicle 13 is to be shared, processes in and after step S109 are executed.

It may be determined in any procedure whether a ride in the vehicle 13 is to be shared, but, in the present embodiment, is determined in the following procedure.

The controller 21 of the control apparatus 20 refers to operation data D4 for taxi Y to determine whether the user 12 can share a ride in taxi Y with another user and travel from the position indicated by the positional data D2 acquired in step S102 to the position of restaurant X identified in step S103. The operation data D4 is data indicating a reservation status or an operation status of taxi Y. The operation data D4 may be stored in advance in the memory 22 of the control apparatus 20, or may be acquired from the third terminal apparatus 50.

In step S109 of FIG. 6, the controller 21 of the control apparatus 20 controls the communication interface 23 to transmit an inquiry D5 as to whether the user 12 is to share a ride in the vehicle 13. The communication interface 23 transmits the inquiry D5 to the second terminal apparatus 40. The content of the inquiry D5 may include information regarding the usage fee of the vehicle 13, such as how much lower the usage fee would be if a ride in the vehicle 13 is shared.

In step S202 of FIG. 7, the communication interface 43 of the second terminal apparatus 40 receives, from the control apparatus 20, the inquiry D5 transmitted in step S109. The controller 41 of the second terminal apparatus 40 acquires the inquiry D5 received by the communication interface 43.

In step S203 of FIG. 7, the controller 41 of the second terminal apparatus 40 presents, to the user 12, the content of the inquiry D5 acquired in step S202.

Specifically, the controller 41 of the second terminal apparatus 40 controls the output interface 45 to output the content of the inquiry D5. In the present embodiment, the controller 41 displays the content of the inquiry D5 on a display corresponding to the output interface 45, but may output the content of the inquiry D5 by voice from a speaker corresponding to the output interface 45.

In step S204 of FIG. 7, the controller 41 of the second terminal apparatus 40 accepts an operation to input a response D6 to the inquiry D5 by the user 12 with the input interface 44 such as a touch screen or a microphone.

In step S205 of FIG. 7, the controller 41 of the second terminal apparatus 40 controls the communication interface 43 to transmit the response D6 input in step S204. The communication interface 43 transmits the response D6 to the control apparatus 20.

In step S110 of FIG. 6, the communication interface 23 of the control apparatus 20 receives, from the second terminal apparatus 40, the response D6 transmitted in step S205. The controller 21 of the control apparatus 20 acquires the response D6 received by the communication interface 23.

In step S111 of FIG. 6, the controller 21 of the control apparatus 20 refers to the response D6 acquired in step S110 to determine whether the user 12 desires to share a ride in the vehicle 13 with another user. In a case in which the user 12 does not desire to share a ride, the processes in and after step S102 are executed again. In a case in which the user 12 desires to share a ride, processes in and after step S112 are executed.

In step S112 of FIG. 6, the controller 21 of the control apparatus 20 determines to take the user 12 to the place 11 using the vehicle 13. That is, the controller 21 determines vehicle dispatch.

The vehicle dispatch may be performed manually, but, in the present embodiment, is performed by the control apparatus 20 in the following procedure.

The controller 21 of the control apparatus 20 controls the communication interface 23 to transmit a vehicle dispatch request requesting that the user 12 be taken to restaurant X by taxi Y. The communication interface 23 transmits the vehicle dispatch request to the third terminal apparatus 50.

The communication interface 53 of the third terminal apparatus 50 receives the vehicle dispatch request from the control apparatus 20. The controller 51 of the third terminal apparatus 50 acquires the vehicle dispatch request received by the communication interface 53. The controller 51 presents the content of the vehicle dispatch request to the driver of taxi Y.

Specifically, the controller 51 of the third terminal apparatus 50 controls the output interface 55 to output the content of the vehicle dispatch request. In the present embodiment, the controller 51 displays the content of the vehicle dispatch request on a display corresponding to the output interface 55, but may output the content of the vehicle dispatch request by voice from a speaker corresponding to the output interface 55.

The controller 51 of the third terminal apparatus 50 accepts an operation, by the driver of taxi Y, to input a vehicle dispatch response that is a response to the vehicle dispatch request with the input interface 54 such as a touch screen or a microphone. The controller 51 controls the communication interface 53 to transmit the input vehicle dispatch response. The communication interface 53 transmits the vehicle dispatch response to the control apparatus 20.

The communication interface 23 of the control apparatus 20 receives the vehicle dispatch response from the third terminal apparatus 50. The controller 21 of the control apparatus 20 acquires the vehicle dispatch response received by the communication interface 23.

In step S113 of FIG. 6, the controller 21 of the control apparatus 20 controls the communication interface 23 to transmit a notification D7 notifying that the user 12 is to be taken to the place 11 using the vehicle 13. The communication interface 23 transmits the notification D7 to the second terminal apparatus 40. The content of the notification D7 may include the content of the vehicle dispatch response from the third terminal apparatus 50. The content of the notification D7 may include information indicating that restaurant X bears part or all of the fee of taxi Y.

In step S206 of FIG. 7, the communication interface 43 of the second terminal apparatus 40 receives, from the control apparatus 20, the notification D7 transmitted in step S113.

The controller 41 of the second terminal apparatus 40 acquires the notification D7 received by the communication interface 43.

The process in step S206 is executed when a certain time period has elapsed without transmission of the inquiry D5 from the control apparatus 20 after the process in step S201. The process in step S206 is also executed immediately after the process in step S205. When a certain time period has elapsed without transmission of the notification D7 from the control apparatus 20, the processes in and after step S201 are executed again.

In step S207 of FIG. 7, the controller 41 of the second terminal apparatus 40 presents, to the user 12, the content of the notification D7 acquired in step S206.

Figure 8:
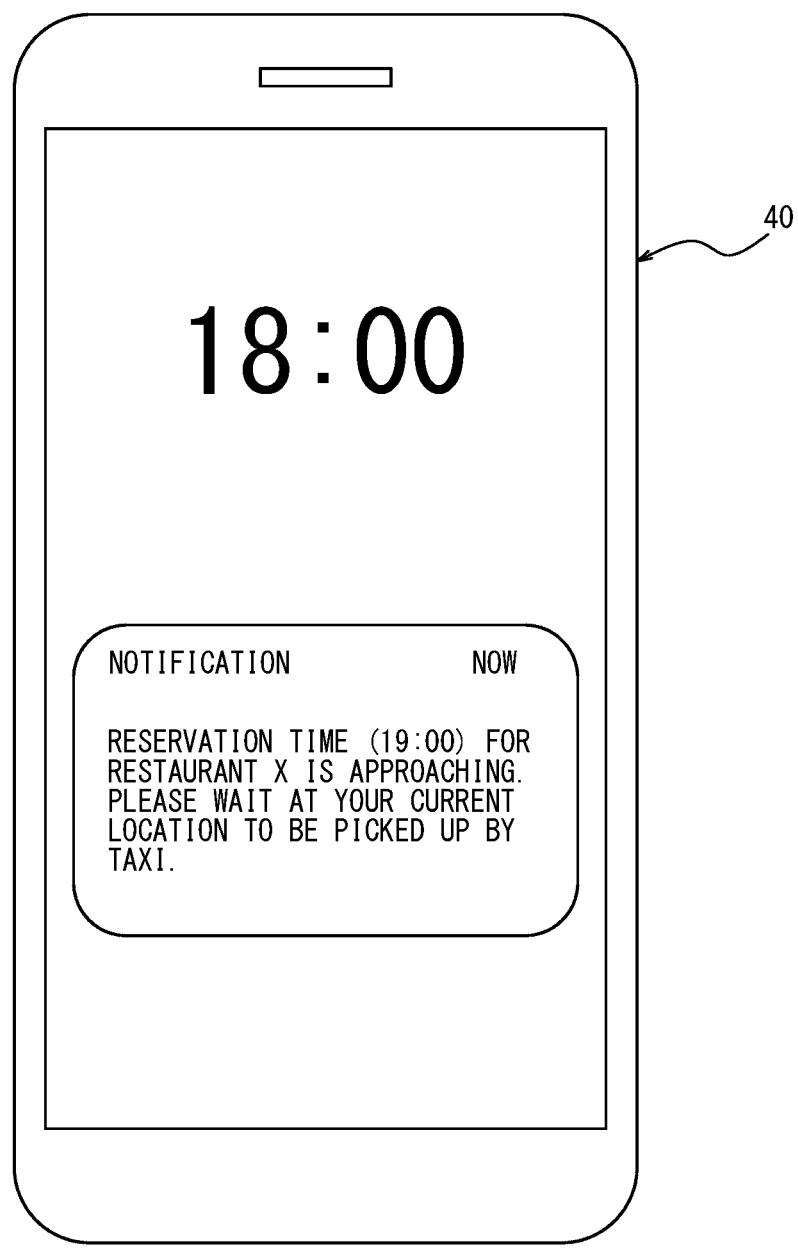
FIG. 8 is a diagram illustrating a screen example of the second terminal apparatus according to the embodiment of the present disclosure.

Specifically, the controller 41 of the second terminal apparatus 40 controls the output interface 45 to output the content of the notification D7. In the present embodiment, the controller 41 displays the content of the notification D7 on a display corresponding to the output interface 45 as illustrated in FIG. 8, but may output the content of the notification D7 by voice from a speaker corresponding to the output interface 45.

As described above, in the present embodiment, the controller 21 of the control apparatus 20 acquires time slot data D1 indicating a reserved time slot at a place 11 that provides a service, and positional data D2 indicating the position of a user 12 who has reserved the time slot indicated by the time slot data D1. The controller 21 determines whether to take the user 12 to the place 11 using the vehicle 13 according to the remaining time Tr until the time slot indicated by the time slot data D1, and the position indicated by the positional data D2.

According to the present embodiment, it is easy to help the user 12 be in time for the reserved time slot. As a result, reservation changes and reservation cancellations may be less likely to occur.

In the present embodiment, the communication interface 23 of the control apparatus 20 transmits, to the second terminal apparatus 40, an inquiry D5 as to whether the user 12 is to share a ride in the vehicle 13, in a case in which another user uses the vehicle 13. The communication interface 23 receives a response D6 to the inquiry D5 from the second terminal apparatus 40. The controller 21 of the control apparatus 20 determines whether to take the user 12 to the place 11 using the vehicle 13 further according to the response D6 received by the communication interface 23.

According to the present embodiment, even in a situation in which the user 12 does not need to be taken to the place 11 using the vehicle 13, it is possible to allow the user 12 to share a ride in the vehicle 13 with another user as desired by the user 12. Therefore, the efficiency is improved. The advantage for the user 12 is that the user 12 can easily use the vehicle 13 because the usage fee is usually lower if a ride in the vehicle 13 is shared.

In the present embodiment, the controller 21 of the control apparatus 20 determines to take the user 12 to the place 11 using the vehicle 13 after the difference obtained by subtracting, from the remaining time Tr, the travel time Tv that is required to travel from the position indicated by the positional data D2 to the place 11, when the user 12 uses the vehicle 13, is equal to or less than a first threshold V1.

According to the present embodiment, determination of vehicle dispatch can be deferred so as not to take the user 12 to the place 11 using the vehicle 13 too early.

In the present embodiment, the controller 21 of the control apparatus 20 determines to take the user 12 to the place 11 using the vehicle 13 in a case in which the difference obtained by subtracting, from the remaining time Tr, the travel time Tv that is required when the user 12 uses the vehicle 13 is equal to or less than a second threshold V2 which is lower than the first threshold V1.

According to the present embodiment, determination of vehicle dispatch can be deferred while there is enough time until the reserved time slot.

In the present embodiment, the controller 21 of the control apparatus 20 determines to take the user 12 to the place 11 using the vehicle 13 in a case in which the difference obtained by subtracting, from the remaining time Tr, the travel time Tp that is required to travel from the position indicated by the positional data D2 to the place 11, when the user 12 uses a public transportation system, is less than a third threshold V3 which is lower than the first threshold V1.

According to the present embodiment, determination of vehicle dispatch can be deferred while the user 12 can be in time for the reserved time slot even if the user 12 goes to the place 11 using the public transportation system.

In the present embodiment, each time the positional data D2 is acquired, the controller 21 of the control apparatus 20 determines whether to take the user 12 to the place 11 using the vehicle 13 according to the remaining time Tr until the time slot indicated by the time slot data D1, and the position indicated by the positional data D2. That is, the process in step S112 is executed each time a positioning result for the second terminal apparatus 40 is transmitted from the second terminal apparatus 40 to the control apparatus 20.

According to the present embodiment, vehicle dispatch can be appropriately determined in accordance with the elapse of time and the change in position of the user 12.

In the present embodiment, the communication interface 43 of the second terminal apparatus 40 receives, from the control apparatus 20, a notification D7 notifying that the user 12 is to be taken to the place 11 using the vehicle 13. The controller 41 of the second terminal apparatus 40 presents, to the user 12, the content of the notification D7 received by the communication interface 43.

According to the present embodiment, even when the user 12 is acting freely, without regard to the time slot reservation at the place 11 made by the user 12, the vehicle 13 for taking the user 12 to the place 11 is automatically dispatched and the vehicle dispatch is notified. Therefore, the convenience is improved.

As a variation of the present embodiment, the user 12 may be notified that the reserved time slot is approaching, before it is determined to take the user 12 to the place 11 using the vehicle 13.

For example, the controller 41 of the control apparatus 20 controls the communication interface 23 to transmit a reminder D8 of the time slot indicated by the time slot data D1 before determining to take the user 12 to the place 11 using the vehicle 13. The communication interface 23 transmits the reminder D8 to the second terminal apparatus 40.

The reminder D8 may be transmitted only once, or may be transmitted multiple times. The time point at which the reminder D8 is transmitted may be any time point before it is determined to take the user 12 to the place 11 using the vehicle 13, and may be, for example, a first time point, a second time point, a third time point, or at least two of these time points as described below.

The first time point is a time point at which it is determined in step S104 that the difference obtained by subtracting the required travel time Tv from the remaining time Tr is greater than the first threshold V1. The second time point is a time point at which it is determined in step S105 that the difference obtained by subtracting the required travel time Tv from the remaining time Tr is greater than the second threshold V2. The third time point is a time point at which it is determined in step S107 that the difference obtained by subtracting the required travel time Tp from the remaining time Tr is equal to or greater than the third threshold V3.

The communication interface 43 of the second terminal apparatus 40 receives the reminder D8 from the control apparatus 20 before it is determined by the control apparatus 20 to take the user 12 to the place 11 using the vehicle 13. The controller 41 of the second terminal apparatus 40 acquires the reminder D8 received by the communication interface 43. The controller 41 presents the content of the reminder D8 to the user 12.

Specifically, the controller 41 of the second terminal apparatus 40 controls the output interface 45 to output the content of the reminder D8. In this variation, the controller 41 displays the content of the reminder D8 on a display corresponding to the output interface 45, but may output the content of the reminder D8 by voice from a speaker corresponding to the output interface 45.

According to this variation, if the user 12 has simply forgotten the time slot, it is possible to remind the user 12 of the reserved time slot and prompt the user 12 to travel to the place 11.

As a variation of the present embodiment, the travel time period from the current position of taxi Y may be taken into account.

For example, the positioner 56 of the third terminal apparatus 50 measures the position of the third terminal apparatus 50. The controller 51 of the third terminal apparatus 50 controls the communication interface 53 to transmit positional data D9 indicating the position measured by the positioner 56 as the position of taxi Y. The communication interface 53 transmits the positional data D9 to the control apparatus 20.

In step S103 of FIG. 6, the communication interface 23 of the control apparatus 20 receives the positional data D9 from the third terminal apparatus 50. The controller 21 of the control apparatus 20 acquires the positional data D9 received by the communication interface 23. The controller 21 refers to the map data D3 to retrieve a route from the position indicated by the positional data D9 to the position indicated by the positional data D2. The controller 21 adds, to the required travel time Tv, the time required for taxi Y to travel on the route from the position indicated by the positional data D9 to the position indicated by the positional data D2, namely, the route from the position of taxi Y to the position of the user 12, as the time period during which the user 12 is to wait.

According to this variation, even if taxi Y is not close to the position of the user 12, it is easy to help the user 12 be in time for the reserved time slot. As a result, reservation changes and reservation cancellations may be less likely to occur.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

The invention claimed is:

1. A control apparatus comprising a controller configured to:
    acquire (i) time slot data, which indicates a reserved time slot at a place that provides a service, and (ii) positional data indicating a position of a user who has reserved the time slot indicated by the time slot data;
    determine whether to take the user to the place using a vehicle according to (i) a remaining time until the time slot indicated by the time slot data and (ii) the position indicated by the positional data; and
    determine to take the user to the place using the vehicle after a difference obtained by subtracting, from the remaining time, a travel time that is required to travel from the position indicated by the positional data to the place, when the user uses the vehicle, is equal to or less than a first threshold.

2. The control apparatus according to claim 1, further comprising a communication interface configured to transmit, to a terminal apparatus of the user, a notification notifying that the user is to be taken to the place using the vehicle, when it is determined by the controller to take the user to the place using the vehicle.

3. The control apparatus according to claim 2, wherein
    the communication interface is configured (i) to transmit, to the terminal apparatus, an inquiry as to whether the user is to share a ride in the vehicle, in a case in which another user uses the vehicle, and (ii) to receive a response to the inquiry from the terminal apparatus, and
    the controller is configured to determine whether to take the user to the place using the vehicle further according to the response received by the communication interface.

4. The control apparatus according to claim 2, wherein
    the communication interface is configured to receive a positioning result for the terminal apparatus from the terminal apparatus, and
    the controller is configured to acquire the positioning result received by the communication interface as the positional data.

5. The control apparatus according to claim 2, wherein the communication interface is configured to transmit a reminder of the time slot indicated by the time slot data to the terminal apparatus before it is determined by the controller to take the user to the place using the vehicle.

6. The control apparatus according to claim 1, wherein the controller determines to take the user to the place using the vehicle in a case in which the difference obtained by subtracting, from the remaining time, the travel time that is required when the user uses the vehicle is equal to or less than a second threshold which is lower than the first threshold.

7. The control apparatus according to claim 1, wherein the controller determines to take the user to the place using the vehicle in a case in which a difference obtained by subtracting, from the remaining time, a travel time that is required to travel from the position indicated by the positional data to the place, when the user uses a public transportation system, is less than a third threshold which is lower than the first threshold.

8. The control apparatus according to claim 1, wherein the controller is configured to, each time the positional data is acquired, determine whether to take the user to the place using the vehicle according to (i) the remaining time until the time slot indicated by the time slot data and (ii) the position indicated by the positional data.

9. A system comprising:
    the control apparatus according to claim 1; and
    a terminal apparatus configured (i) to receive, from the control apparatus, a notification notifying that the user is to be taken to the place using the vehicle, when it is determined by the control apparatus to take the user to the place using the vehicle, and (ii) to present content of the received notification to the user.

10. A non-transitory computer readable medium storing a program configured to cause a computer to execute operations, the operations comprising:
    receiving a notification from a control apparatus configured to determine whether to take a user, who has reserved a time slot at a place that provides a service, to the place using a vehicle according to (i) a remaining time until the reserved time slot and (ii) a position of the user, the notification notifying that the user is to be taken to the place using the vehicle;
    receiving a reminder of the time slot from the control apparatus before it is determined by the control apparatus to take the user to the place using the vehicle;
    presenting to the user content of the received notification; and
    presenting to the user content of the received reminder.

11. The non-transitory computer readable medium according to claim 10, wherein the operations further comprise:
    receiving, from the control apparatus, an inquiry as to whether the user is to share a ride in the vehicle, in a case in which another user uses the vehicle;
    presenting content of the received inquiry to the user;
    accepting an operation to input a response to the inquiry; and
    transmitting the input response to the control apparatus.

12. The non-transitory computer readable medium according to claim 10, wherein the operations further comprise transmitting a positioning result for the computer to the control apparatus.

13. A terminal apparatus configured to execute the operations in accordance with the program stored in the non-transitory computer readable medium according to claim 10.

14. A control apparatus comprising:
    a controller configured to:
        acquire (i) time slot data, which indicates a reserved time slot at a place that provides a service, and (ii) positional data indicating a position of a user who has reserved the time slot indicated by the time slot data; and
        determine whether to take the user to the place using a vehicle according to (i) a remaining time until the time slot indicated by the time slot data and (ii) the position indicated by the positional data; and
    a communication interface configured to:
        transmit, to a terminal apparatus of the user, a notification notifying that the user is to be taken to the place using the vehicle, when it is determined by the controller to take the user to the place using the vehicle; and
        transmit a reminder of the time slot indicated by the time slot data to the terminal apparatus before it is determined by the controller to take the user to the place using the vehicle.

* * * * *